Figure 1:
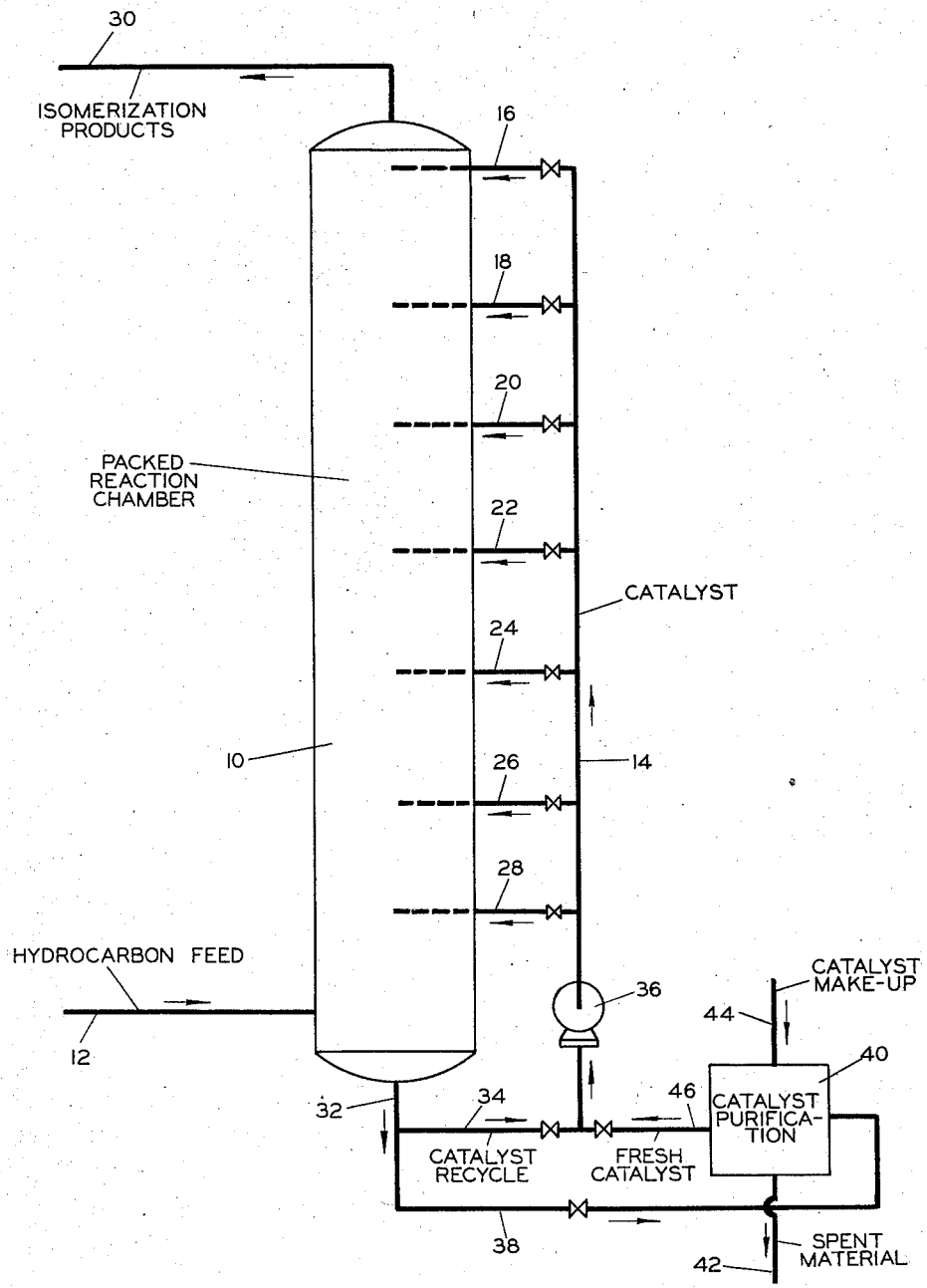

INVENTORS
THOMAS B. HUDSON
JOHN D. UPHAM
BY
ATTORNEYS

INVENTORS
THOMAS B. HUDSON
JOHN D. UPHAM
BY
ATTORNEYS

Patented Apr. 6, 1948

2,439,301

UNITED STATES PATENT OFFICE 2,439,301

ISOMERIZATION OF HYDROCARBONS

Thomas B. Hudson and John D. Upham, Bartlesville, Okla., assignors to Phillips Petroleum Company, a corporation of Delaware Application October 5, 1942, Serial No. 460,852

5 Claims. (Cl. 260—683.5)

This invention relates to the catalytic isomerization of hydrocarbons, particularly the lower boiling saturated hydrocarbons such as the paraffins and the cycloparaffins or naphthenes. It has particular application to the formation of branched chain paraffins from less-branched or straight chain paraffins of the same molecular weight, wherein a mobile isomerization catalyst is utilized.

Isomerization of hydrocarbons has become an important industrial process because of the increased tendency toward high octane number motor fuels, and the development of special uses for certain individual hydrocarbons or groups of hydrocarbons. Thus, the isoparaffins are ordinarily much more valuable than the normal paraffins, both for use per se, and as stock for manufacturing other hydrocarbons by alkylation, dehydrogenation followed by polymerization, or other conversion processes. One of the most important commercial isomerization processes at the present time is the formation of isobutane from normal butane, using aluminum chloride catalysts. Accordingly, we shall describe our invention with particular reference to such a process, and its application to other isomerizations, and/or other catalysts, will be obvious to those skilled in the art in view of the present disclosure.

The isomerizations with which this invention is concerned are equilibrium reactions; that is, at a given temperature the percentage of each of the individual isomers in a mixture of isomers is fixed if equilibrium is attained. For example, if either pure normal butane or pure isobutane be contacted with a suitable catalyst, such as aluminum chloride, under given temperature and pressure conditions permitting the reaction to proceed but preferably avoiding side reactions such as cracking, after a period of time an equilibrium mixture of normal and isobutane will be formed. In this mixture, the percentage of isobutane will be the same regardless of whether the charging stock was isobutane or normal butane. This means that in isomerizing normal butane to produce isobutane, there is a maximum conversion obtainable at any given temperature. The lower temperatures give the greatest conversion, but too low a temperature cannot be used because the reaction rate will decrease to an uneconomic level. On the other hand, higher temperatures give higher reaction rates, but the equilibrium mixture contains less isobutane. Furthermore, excessively high temperatures promote undesired side reactions, particularly cracking.

While the percentage yield of isobutane at equilibrium is dependent only on temperature, the rate of reaction is dependent on temperature and also on other important factors, including relative concentration of normal and isobutane in the mixture at the given time, catalyst activity, and the amount of catalyst surface contacted by the butane, or in other words, on the time of contact of a unit volume of butane with a unit of catalyst activity.

A large surface area for a given weight of active catalytic material may be obtained by various expedients which are well known in the art. For instance, inert carriers or extenders may be impregnated by or mixed with the catalyst, or the catalyst may be produced in a porous form, or prepared in a condition of fine subdivision as in the use of small grains or powdered catalyst, which may be suspended in liquid or gaseous hydrocarbons undergoing isomerization. The amount of catalyst surface contacted with reactants is also dependent on the concentration of catalyst in reactants, that is, the amount of catalyst, of whatever kind, mixed with the reactants, or placed in a stationary bed of catalyst through which the reactants pass, and on the flow rate of reactants through a reaction zone.

Thus it is seen that a number of different reaction conditions influence the rate of reaction, and these reaction conditions frequently vary from point to point in the reaction zone. As the conversion of normal to isobutane occurs in an isomerization zone through which the hydrocarbons are flowing, the decrease in concentration of the normal butane and corresponding increase in concentration of isobutane tends to slow the reaction, particularly as equilibrium is approached. Due to the exothermic nature of this reaction, the temperature has a tendency to increase, causing a tendency toward increased reaction rate. A mobile catalyst becomes deactivated as it passes through the reaction zone, sometimes slightly and sometimes greatly, depending upon the nature of the catalyst and the severity of conditions, and the reaction rate is less at the point of less catalytic activity.

An object of this invention is to provide a process for the catalytic isomerization of hydrocarbons. Another object is to provide an improved method of contacting catalysts with saturated hydrocarbons to promote molecular rearrangement thereof. A primary object is to correlate the ratio of catalyst activity to reactants throughout an isomerization zone with varying reaction conditions therein so as to maintain substantially constant reaction rates throughout said zone, or at least partially to compensate for said varying reaction conditions. Another object is to provide for the rapid attainment of equilibrium conditions and thus decrease the reaction time required for a given conversion. A further object is to diminish the extent of undesired side reactions such as cracking and the like and thus give increased yields of desired hydrocarbons, improved catalyst life, and other benefits. A further object is to provide improved methods for carrying out isomerization reactions involving a primary catalyst and a promoter, wherein a temperature gradient exists. Yet another object is to provide for the use of mobile isomerization catalysts. A still further object is to provide for the recovery and/or regeneration of such catalysts. Another object is to provide novel methods of conducting isomerization reactions with gaseous, liquid, and/or solid catalysts, wherein said catalysts are introduced multipoint into a reaction zone. Other objects and advantages will become apparent as the disclosure proceeds.

We have now found that the tendencies toward change in reaction rate caused by the varying reaction conditions may be at least partially compensated for, or a substantially constant reaction rate may be maintained, throughout a reaction zone in which mobile isomerization catalysts are used with flowing streams of liquid and/or gaseous reactants by introducing said catalyst into the reaction zone at a plurality of points, the quantity and/or activity of the catalyst introduced at each point being correlated with the reaction conditions prevailing at that point. Either concurrent or countercurrent flow of catalyst and reactants may be used, depending upon the conditions and the type of catalyst used. The catalyst may be miscible with, or immiscible with the reactants. The various modes of operating in accordance with our invention are not exact equivalents, but may be carried out by one skilled in the art by following the basic principles disclosed herein.

Figure 2:
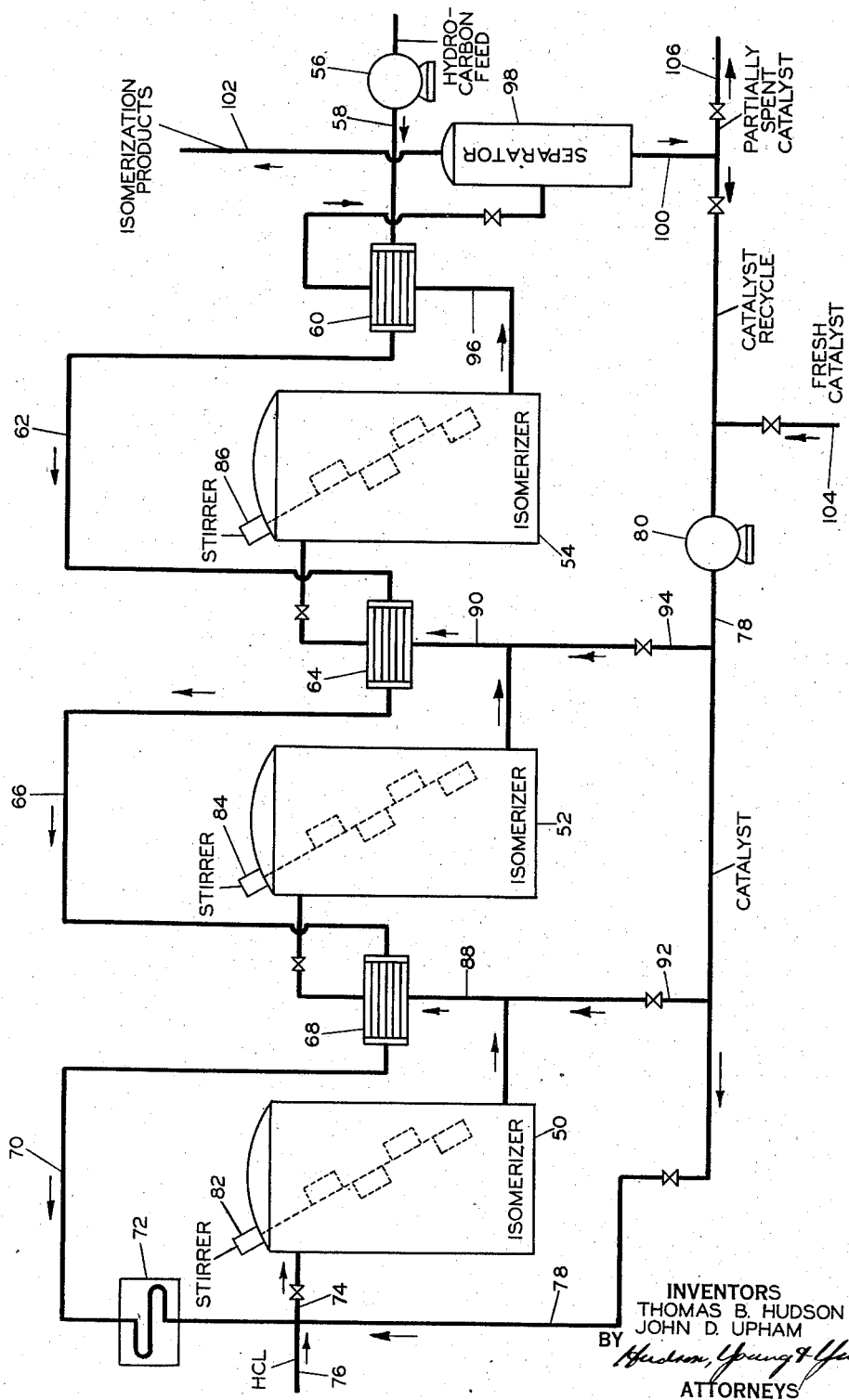

The accompanying drawings are provided to better explain the invention, and taken in conjunction with the description thereof, will serve to exemplify the invention. Figure 1 shows in semi-diagrammatic form suitable apparatus for carrying out the vapor phase isomerization of normal butane, using a fluid melt type of aluminum chloride catalyst, wherein the temperature of the reactant increases during passage through the reaction zone due to the exothermic nature of the reaction. Figure 2 shows in semi-diagrammatic form a series of isomerization units with associated equipment for effecting isomerization in the liquid phase, with a decreasing temperature gradient to obtain maximum equilibrium yields of isobutane from normal butane.

In Figure 1, the reaction chamber 10 comprises a ceramic-lined vertical tower packed with ceramic-ware Raschig rings, stones, or other suitable means for effecting intimate contact between reactants and liquid catalyst. The gaseous isomerization feed which is led into reactor 10 through line 12 comprises normal butane, either pure or admixed with minor amounts of isobutane, propane, hydrogen, or other light gases, and anhydrous hydrogen chloride which acts as catalyst activator. This feed must be substantially anhydrous, and may if necessary be dehydrated by suitable methods prior to its introduction into chamber 10. The hydrogen chloride may be introduced into the reaction chamber in other ways if desired. The feed in line 12 is heated to the proper temperature by means not shown. Suitable temperature and pressure conditions at the inlet of chamber 10 are 300° F. and 150 lb. per. sq. in. gage. A flow rate of 0.1 to 2.0 liquid volumes of butane per volume of catalyst chamber per hour may be used, and complete equilibrium conversion in one pass is not ordinarily attempted in such a process, the hydrocarbon effluents comprising from 25 to 50 per cent isobutane, depending upon the flow rate used.

The catalyst composition employed comprises a fluid melt of aluminum chloride with sodium and potassium chlorides, or with halides of other low-melting metals. The molar ratio of aluminum chloride to the alkali metal chloride should be at least about 1.2 to 1, and greater ratios are advantageous. The catalyst composition is promoted by a halide of one of the group V metals or a halide of one of the sulfur-group elements of group VI of the periodic system. The fluid catalyst flows through conduit 14, and is introduced into reaction chamber 10 at a plurality of points through conduits 16, 18, 20, 22, 24, 26, and 28. It will be understood that more or fewer such conduits may be used, as required by the particular reaction chamber and conversion taking place therein. The catalyst thus introduced into chamber 10 flows downward over the packing material therein, thus presenting an extended surface to the upwardly flowing gases. It will be seen that in this method of operating, the amount of catalyst increases as it flows down the column 10, which in turn means that as the reactants flow upward through the column they contact progressively smaller amounts of catalyst.

As the reactants pass through the reaction chamber, the normal butane is isomerized to isobutane with the evolution of heat. Such heat of reaction is difficult to remove from the large reactor, and as a consequence the temperature of the gases rises as they pass upwardly through the reaction chamber 10. The temperature at the outlet thereof is accordingly appreciably higher than at the inlet, the exact temperature difference, of course, varying with the particular chamber, type of reaction, flow rate, extent of reaction, etc. In many cases this temperature difference will amount to from 15 to 50 or 60° F. or even more. Such an increase in temperature tends to increase the reaction rate, and in the ordinary methods of isomerization wherein the reactants are passed through a uniform bed of catalyst, the reaction frequently "runs-away" and is difficult to bring under control. Increased reaction rate due to increased temperature causes an increased rate of heat evolution, which in turn tends to increase the temperature still more. Excessive temperatures caused by such action cause cracking and other undesirable degradation of the butane undergoing reaction, with consequent loss of material, increased fractionation load from light gases so-formed, and damage to the catalyst.

Such an uncontrolled temperature rise is obviated in our process, due to the fact that as the temperature rises, the reactants are contacted with less and less catalyst. The amount of the catalyst at all points in the reaction chamber is correlated with the temperature prevailing at each of said points, by controlling the amount of catalyst introduced through each of the catalyst conduits along the chamber, and thus the extent of reaction is limited so that in spite of increasing temperature, a substantially constant rate of reaction may readily be maintained throughout the reaction zone if desired. Another advantage is that the limited contact with catalyst of the hottest reactants avoids an undue amount of cracking, so that the isomerization reaction continues at the desired rate while the ratio of cracking to isomerization is less than it would be at the same temperature if the catalyst concentration were higher.

Other varying reaction conditions operating to influence the rate of reaction are the decreasing concentration of normal butane, and the deactivation of the catalyst occurring as it flows through the reaction zone. As the conversion proceeds, the normal butane concentration drops and that of isobutane increases so that mass action effects tend to slow the reaction. In the case just discussed, since equilibrium concentrations, at which all reaction will stop, are not closely approached, this factor is not of so much importance, although it must be taken into account in correlating the catalyst activity at points throughout the column with the reaction conditions. The rate of deactivation of the catalyst as it flows through the chamber will depend upon temperature, amount of excess aluminum chloride in the melt, flow rate of reactants, etc. We have found that the countercurrent flow of catalyst and reactants, with multipoint injection of fresh catalyst, has advantage in that the fresh feed is contacted with a relatively large volume of catalyst which is diluted somewhat with spent catalytic material. This is opposite to the ordinary process with concurrent flow of catalyst and reactants, in which the reactants first contact completely fresh catalyst, and our method, even though the total catalyst activity at the point of first contact with reactants may, as in the case described in conjunction with Figure 1, be greater than at other points, the dilution effect of some spent catalyst aids in promoting smooth and regular reaction. In many cases, variation of one of the reaction conditions may have an effect on reaction rate opposite to that of another varying reaction condition, and in any particular case, the overall effect of the various reaction conditions must be taken into account and correlated with the amount of catalyst introduced at each point.

The isomerization products, which include isobutane, unconverted normal butane, hydrogen chloride, light gases, and traces of C₅ and heavier hydrocarbons, leave chamber 10 via line 30, and are passed to conventional treating and separating means not shown. Ordinarily the isobutane is separated as a product of the process, normal butane and hydrogen chloride are recycled, and light gases may or may not be recycled. Frequently small amounts of hydrogen and/or propane are added to the feed to reduce side reactions, and these gases may be recycled. Certain amounts of propane are formed in the process, and generally separated out from the effluents.

The catalyst melt is removed from the bottom of chamber 10 via conduit 32, and most of it is recycled to conduit 14 via line 34 and pump 36. Means other than pumping, such as pressuring with gas, gas-lift, etc. may be used for removing the catalyst melt, and the melt may be heated if necessary by means not shown. A portion of the catalyst stream is passed via line 38 to a purification system indicated diagrammatically at 40. In this purification, completely spent aluminum chloride and other undesirable materials such as heavy hydrocarbons are removed via line 42, and sufficient fresh aluminum chloride is introduced into the catalyst composition via line 44 to make up for that lost from the process. Catalyst flows from purification 40 to line 14 via line 46.

In Figure 2, the isomerization of normal butane is carried out in the liquid phase, using a slurry of finely divided aluminum chloride as the catalyst. The reaction is carried out continuously by concurrent flow of reactants and catalyst through a series of reactors 50, 52, and 54. A greater or smaller number of such reactors may of course be used as conditions warrant. The hydrocarbon feed, which is predominantly normal butane, is passed in the liquid state from pump 56 at 500 lb. per sq. in. pressure via line 58 through heat exchanger 60, and continues on via lines 62, 66, and 70 through heat exchangers 64 and 68 to heater 72, wherein it is brought to the initial reaction temperature, such as 250° F. The thus-heated butane then passes into isomerizer 50 via line 74, admixed with suitable amounts of hydrogen chloride activator from line 76 and catalyst from line 78. The catalyst in line 78 can be a slurry and/or solution of aluminum chloride in liquid hydrocarbons, preferably butane, and is pumped by pump 80 or otherwise forced through the system. A heavy oil may sometimes be used to advantage in forming this catalyst composition.

The butane, hydrogen chloride, and aluminum chloride are maintained in constant agitation in isomerizer 50 by means of stirrer 82. Isomerizers 52 and 54 are similarly equipped with stirrers 84 and 86. The continuous flow of material into vessel 50 through line 74 causes a continuous flow of hydrocarbons, hydrogen chloride, and catalyst from vessel 50 to vessel 52 via line 88, this material passing through heat exchanger 68 between the two vessels in order to impart heat to the inflowing butane in line 66, being itself cooled to the temperature, around 200° F., required in isomerizer 52. Similarly, material from isomerizer 52 flows to isomerizer 54 via line 90 and heat exchanger 64. A lower temperature, such as 170° F., is maintained in isomerizer 54. It will be understood that by-passes around the heat exchangers may be provided for controlling the temperatures to the desired extent, and auxiliary heating or cooling means may be provided for the incoming butane feed or the flowing reaction mixture as required.

The isomerizers 50, 52, and 54 are shown to be of the same size as a matter of convenience in the drawing. In actual practice, they may vary in size, depending upon the contact time desired in each of the zones. While any particular molecule of butane may remain in one of the isomerizers for an extremely long or extremely short time, the average time of residence therein is determined by the flow rate of reactants and catalyst and by the volume of the isomerizer.

In the method of operating just described, the total contact time may be chosen readily so that essentially equilibrium conversion is obtained. Since the equilibrium conversion is greatest at low temperatures, it is desirable to complete the reaction at the lowest convenient temperature at which an economic reaction rate may be obtained. However, to carry out the entire isomerization at such a low temperature would require an unnecessarily long reaction time, and it has been found that the reaction may be initiated at a high temperature, the reactants being held at that temperature for a time sufficient to obtain considerable isomerization, but limited so that cracking does not occur.

Thus the first reactor in the series, isomerizer 50, is maintained at a relatively high temperature. The butane is maintained therein until say 60 or 70 per cent of the equilibrium conversion at that temperature is obtained, at which time an appreciable amount of undesired cracking is incipient. At such time, the reactants leave chamber 50 and pass on to chamber 52 at a lower temperature, where further conversion is obtained. The flow rate is adjusted so that the residence time at that temperature is sufficient to obtain additional isomerization but insufficient to allow cracking. The butane finally passes to chamber 54 where it is held at the lowest temperature, for additional isomerization, generally until substantially equilibrium conversion is obtained. This method of operating at a decreasing temperature gradient is now generally known to the industry, and is described in Lynch U. S. Patent 2,280,710.

We have found that by introducing the mobile catalyst into the reactants at a plurality of points, the amount introduced at each of said points being correlated with the particular reaction conditions in the system, a greatly improved operation may be obtained. This is accomplished by introducing the catalyst into the reaction mixture not only into line 74 from line 78, but also into line 88 via line 92 and into line 90 via line 94. In this way, the concentration of catalyst in reactants is increased as the reactants pass through the system at a decreasing temperature gradient. The thus-introduced catalyst also serves to more than compensate for any catalyst deactivation occurring in the system, and the ratio of catalyst activity to reactants increases in the direction of flow, rather than remaining constant or decreasing as would be the case in the absence of the multipoint introduction of the catalyst.

As stated above, the rate of isomerization decreases with decrease in temperature, and this tendency toward decreased rate is at least partially compensated for by utilization of our invention, obtaining the advantages of the decreasing temperature gradient, while substantially decreasing the total time required to effect the desired extent of conversion.

Our invention also acts to at least partially overcome the mass action effects of the isobutane present in the reaction zone. As the extent of conversion approaches equilibrium, the reaction rate normally tends to decrease, until when equilibrium concentrations of reactants are attained, further reaction does not occur. Thus, as the reaction mixture flows through the reaction zones, the reaction rate tends to decrease not only due to the decreasing temperature, but also due to the approaching of equilibrium conditions. In fact, as heretofore explained, the purpose of lowering the temperature is to shift the equilibrium. It will be seen that our invention, by increasing the concentration of catalyst, provides a means of speeding up the reaction in spite of increasing concentration of isobutane, which is particularly valuable when the equilibrium percentage of isobutane is slowly approached. Thus, the amount of catalyst introduced at each of the points in the system is correlated with temperature and with concentration of reactants to accomplish a more efficient conversion.

The total isomerization mixture leaves isomerizer 54 via line 96 and heat exchanger 60, and passes to separator 98, wherein catalyst is separated from reactants by gravity settling, centrifuging, filtering, or other means, and is removed, preferably still as a slurry, through line 100. Thus all of the catalyst used in the various parts of the apparatus and introduced at the different points is readily removed from the effluents in a single separation step. The isomerization effluents comprising isobutane, normal butane, HCl, and other light gases, as well as small amounts of $C_5$ and heavier hydrocarbons, pass from separator 98 via line 102 to conventional treatment, separation, etc. not shown. A portion of the catalyst is recycled to the system from line 100 via line 78 and pump 80. Fresh make-up catalyst may be introduced through line 104. A portion of the catalyst is taken from line 100 through line 106, and may be sent to a purification step wherein recoverable aluminum cloride is separated and returned to the system, while spent material such as inactive aluminum chloride-hydrocarbon complexes and other undesirable matter is removed from the system.

The invention has been described with particular reference to aluminum chloride catalysts. However, it is to be understood that it is in nowise limited thereto, and may be used in conjunction with many other mobile isomerization catalysts. Other aluminum halides, particularly aluminum bromide, and various other metal halide isomerization catalysts of the Friedel-Crafts type may be used. Ordinarily halogen-containing promotors, such as hydrogen chloride, hydrogen bromide, etc., or other promotors are used with such catalysts.

While hydrogen fluoride may be used as a promotor for the active metal halide catalysts, it has been found that hydrogen fluoride alone is a very active and versatile isomerization catalyst. Thus the isomerization catalyst used in our invention may comrise essentially hydrogen fluoride, for example, liquid concentrated or substantially anhydrous hydrogen fluoride, or gaseous hydrogen fluoride. The usefulness of this particular catalyst is realized in view of the fact that it may be used in either the liquid or the vapor phase, in contact with liquid or vaporous hydrocarbons. In the liquid phase it may pass concurrently with or countercurrently to liquid and/or gaseous hydrocarbons, and in the vapor phase it may pass concurrently with gaseous or liquid hydrocarbons or countercurrently to liquid hydrocarbons. Thus the particular mode of operating with hydrogen fluoride as an isomerization catalyst is readily chosen to conform with the hydrocarbons undergoing treatment and with the conversion desired. By the multipoint injection of the hydrogen fluoride into the reaction zone, the total catalytic activity is varied from point to point in the reaction zone in inverse ratio to the normal variations of reaction rate from point to point, thus establishing a more desirable reaction rate throughout the zone.

While we have discussed our invention in some detail, and presented various modes of operation, it is not limited to the exact variants shown, but is subject to numerous other modifications. For example, mixtures of fresh or regenerated catalyst along with partially or totally spent catalyst may be introduced into the reaction zone in different proportions at the different points, in order to control the total activity at each point. Reactants, diluents, heat carriers, and the like may be used along with the catalyst. These and

We claim:

1. A process for the isomerization of normal butane to isobutane under conditions of decreasing temperature, decreasing concentration of reactants, and normally decreasing activity of catalyst which comprises passing liquid hydrocarbons comprising normal butane admixed with effective amounts of hydrogen chloride and finely divided aluminum chloride catalyst through a reaction zone, maintaining a decreasing temperature gradient in the direction of flow of said hydrocarbons and said catalyst, maintaining a flow rate such that the time of residence of said hydrocarbons at any temperature level is sufficient to effect substantial isomerization but insufficient to permit any substantial cracking, and such that the final temperature level is sufficiently low to obtain a concentration of isobutane in excess of the equilibrium concentration thereof at the highest temperature level, and introducing a separately controlled quantity of said finely divided aluminum chloride catalyst into said liquid hydrocarbons at each of a plurality of points along the direction of flow sufficient to more than overcome deactivation of catalyst which would normally occur in the absence of the catalyst thus introduced at said plurality of points and sufficient to increase the ratio of catalyst activity to hydrocarbons along the direction of flow, thereby establishing a constant rate of reaction throughout the reaction zone despite said decreasing temperature gradient, decreasing concentration of normal butane, and normally decreasing catalyst activity.

2. A process for the isomerization of normal butane under conditions of decreasing temperature, decreasing concentration of reactants, and normally decreasing activity of catalyst to isobutane which comprises passing a liquid hydrocarbon feed comprising normal butane in indirect heat exchange at a plurality of points with a warmer reaction mixture flowing in a reaction zone in an opposite direction to heat said feed and to cool the reaction mixture as it flows through said reaction zone, admixing with thusheated feed effective amounts of hydrogen chloride and a finely divided aluminum chloride catalyst composition hereinafter described to form said reaction mixture, passing same at isomerization conditions through said reaction zone in indirect heat exchange with said feed as aforesaid thereby maintaining a decreasing temperature gradient in the direction of flow of said reaction mixture, maintaining a flow rate through said reaction zone such that the time of residence of said hydrocarbons within each temperature range is sufficient to effect substantial isomerization but insufficient to permit any substantial cracking, maintaining the final reaction temperature of said reaction mixture sufficiently low to obtain a concentration of isobutane in excess of the equilibrium concentration thereof at the highest temperature range, separating said catalyst from effluents of said reaction zone, discarding a portion of the thus-separated catalyst and adding fresh makeup catalyst to the balance to control the activity thereof, introducing a portion of said catalyst composition of controlled activity into the heated feed as aforesaid in a controlled quantity and sufficient to effect some isomerization but insufficient to effect the total isomerization in said reaction zone within the desired time, introducing at each of a plurality of points spaced from the feed inlet point along the line of flow of reaction mixture an additional controlled quantity of said catalyst composition to increase the concentration of catalyst in reactants and sufficient to more than compensate for deactivation of catalyst which would normally occur in the absence of the catalyst thus introduced at said plurality of points thus increasing the ratio of catalyst activity to hydrocarbons along the line of flow and thereby establishing a constant rate of reaction throughout the reaction zone despite said decreasing temperature gradient, decreasing concentration of normal butane, and normally decreasing catalyst activity.

3. A process for the isomerization of a first saturated hydrocarbon into an isomer thereof having the same molecular weight and whose concentration in an equilibrium mixture with said first saturated hydrocarbon increases with decreasing temperature, said process being effected under conditions of decreasing temperature, decreasing concentration of reactants, and normally decreasing activity of catalyst, which comprises passing liquid hydrocarbons comprising said first saturated hydrocarbon admixed with effective amounts of a mobile Friedel-Crafts type metal halide isomerization catalyst through a reaction zone, maintaining a decreasing temperature gradient in the direction of flow of said hydrocarbons and said catalyst, maintaining a flow rate such that the time of residence of said hydrocarbons at any temperature level is sufficient to effect substantial isomerization but insufficient to permit any substantial cracking and such that the final temperature level is sufficiently low to obtain a concentration of said isomer in excess of the equilibrium concentration thereof at the highest temperature level, and introducing a separately controlled quantity of said isomerization catalyst into said liquid hydrocarbons at each of a plurality of points along the direction of flow sufficient to more than overcome deactivation of catalyst which would normally occur in the absence of the catalyst thus introduced at said plurality of points and sufficient to increase the ratio of catalyst activity to hydrocarbons along the direction of flow, thereby establishing a constant rate of reaction throughout the reaction zone despite said decreasing temperature gradient, decreasing concentration of said first saturated hydrocarbon, and normally decreasing catalyst activity.

4. The process of claim 3 in which said catalyst comprises an aluminum halide.

5. The process of claim 3 in which said catalyst comprises aluminum chloride.

THOMAS B. HUDSON.
JOHN D. UPHAM.

REFERENCES CITED

The following references are of record in the file of this patent:

UNITED STATES PATENTS

| Number | Name | Date |
|---|---|---|
| 1,870,792 | Clark | Aug. 9, 1932 |
| 1,981,305 | Bray et al. | Nov. 20, 1934 |
| 2,280,710 | Lynch | Apr. 21, 1942 |
| 2,283,143 | Ipatieff et al. | May 12, 1942 |
| 2,283,852 | Egloff | May 19, 1942 |
| 2,325,052 | Grosse et al. | July 27, 1943 |
| 2,342,124 | Danforth | Feb. 22, 1944 |
| 2,343,406 | Dryer | Mar. 7, 1944 |
| 2,349,516 | Pines et al. | May 23, 1944 |

Certificate of Correction

Patent No. 2,439,301.　　　　　　　　　　　　　　　　　　　　　April 6, 1948.

THOMAS B. HUDSON ET AL.

It is hereby certified that error appears in the printed specification of the above numbered patent requiring correction as follows: Column 9, lines 41 and 42, claim 2, strike out the words "to isobutane" and insert the same in line 39, same claim, after "butane"; and that the said Letters Patent should be read with this correction therein that the same may conform to the record of the case in the Patent Office.

Signed and sealed this 22nd day of June, A. D. 1948.

[SEAL]

THOMAS F. MURPHY,
*Assistant Commissioner of Patents.*